July 8, 1924.
T. SHIPLEY
1,500,279
METHOD OF AND MEANS FOR SEPARATING OIL FROM THE REFRIGERANT
IN REFRIGERATING SYSTEMS
Filed Oct. 2, 1923     4 Sheets-Sheet 1
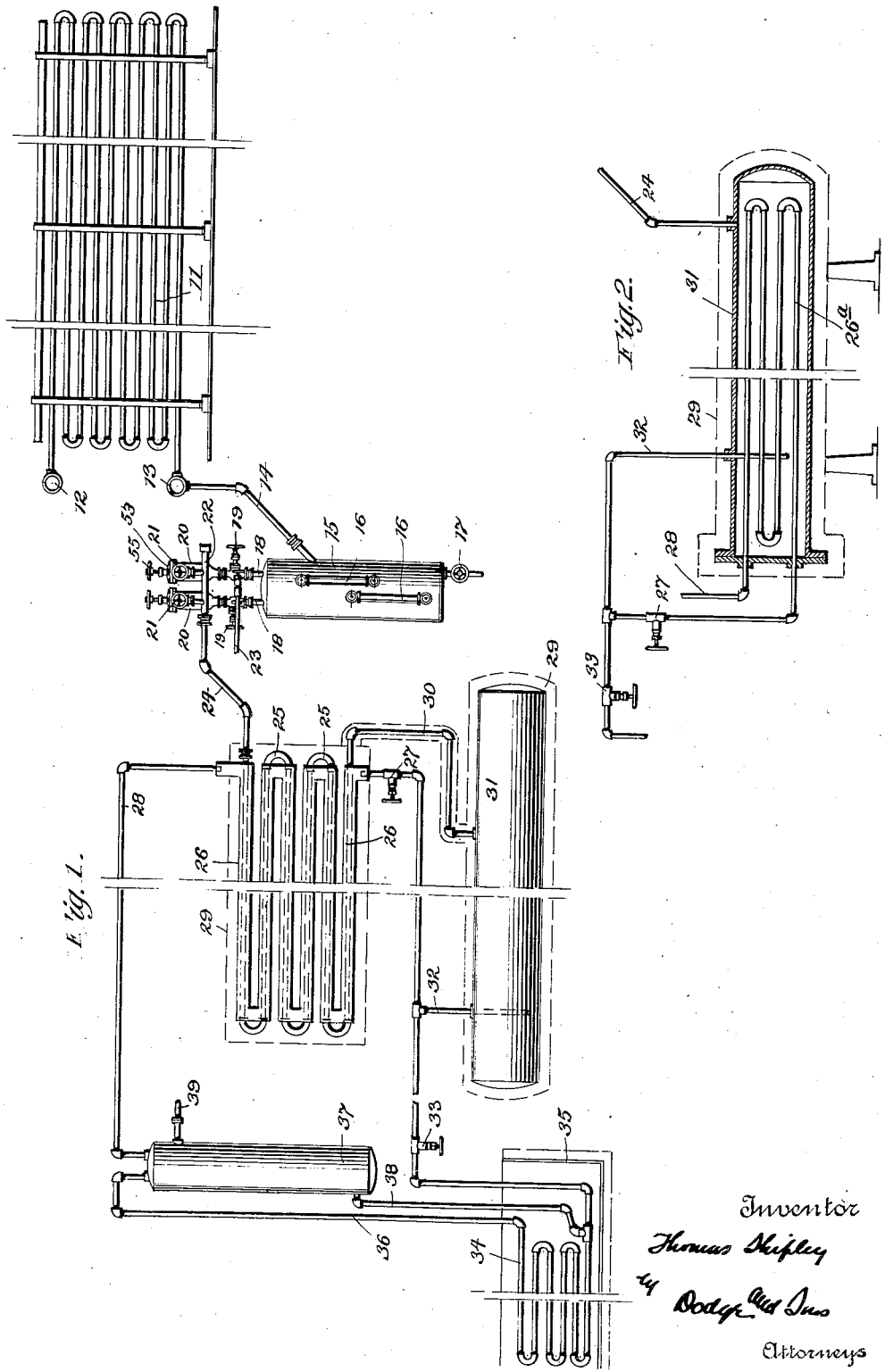

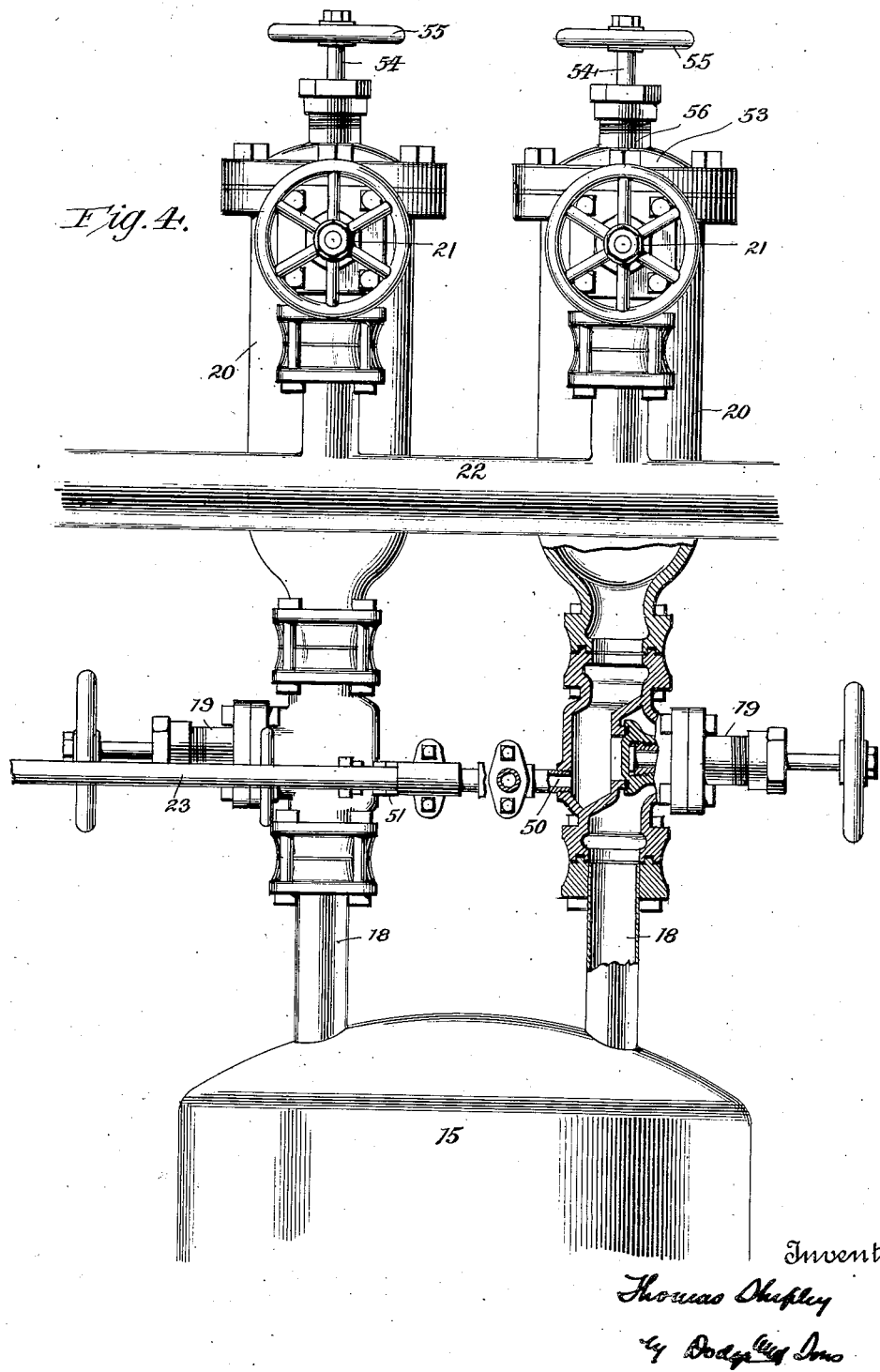

July 8, 1924. 1,500,279
T. SHIPLEY
METHOD OF AND MEANS FOR SEPARATING OIL FROM THE REFRIGERANT
IN REFRIGERATING SYSTEMS
Filed Oct. 2, 1923 4 Sheets-Sheet 4
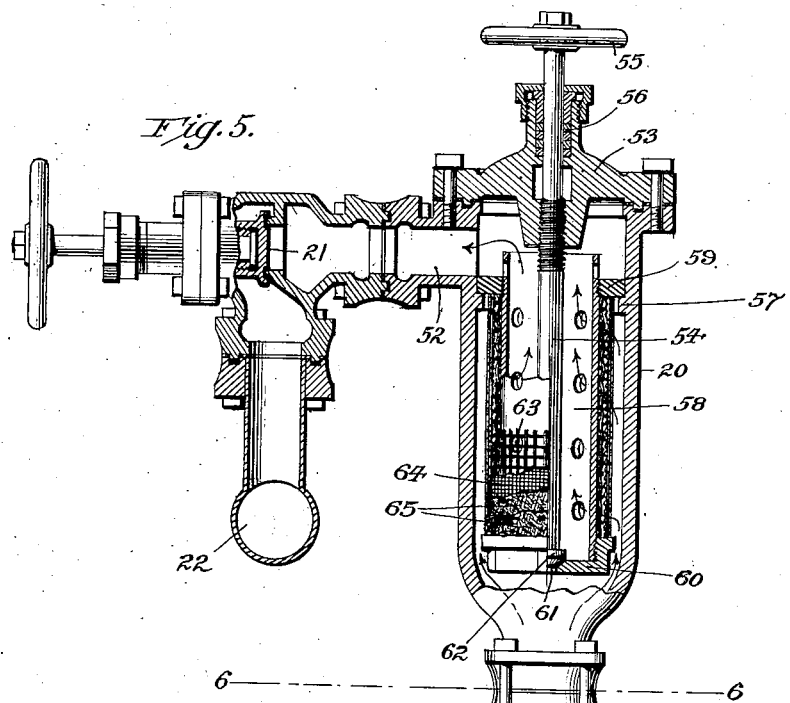

Patented July 8, 1924.

1,500,279

UNITED STATES PATENT OFFICE.

THOMAS SHIPLEY, OF YORK, PENNSYLVANIA.

METHOD OF AND MEANS FOR SEPARATING OIL FROM THE REFRIGERANT IN REFRIGERATING SYSTEMS.

Application filed October 2, 1923. Serial No. 666,196.

*To all whom it may concern:*

Be it known that I, THOMAS SHIPLEY, a citizen of the United States, residing at York, in the county of York and State of Pennsylvania, have invented certain new and useful Methods of and Means for Separating Oil from the Refrigerant in Refrigerating Systems, of which the following is a specification.

This invention relates to refrigeration, and particularly to a method of and means for removing oil and the like from the ammonia or other refrigerant gas.

In refrigeration systems of the compressor condenser evaporator circuit type, difficulty is always likely to be caused by oil taken up by the ammonia or other gaseous refrigerant in the compressor cylinders and later deposited chiefly in the expansion valve and heat absorbing coils. As this is the cold part of the circuit, this oil congeals, interferes with the steady flow of ammonia through the expansion valve, and covers the interior of the heat absorbing coils with a heat insulating coating of oil.

The customary practice heretofore has been to interpose a trap between the compressor and the condenser and rely upon this trap to remove the oil. This function the trap performs only imperfectly, for the reason that the gas leaves the compressor at high temperature and the oil is largely present in the form of a mist or vapor which in part, at least, passes through the trap with the gas.

To remedy this defect, it has been proposed to place an additional trap between the condenser and the receiver. The theory was that any oil passing from the condenser with the then liquid refrigerant must, by reason of the lowered temperature have resumed its liquid state, and hence must be in a favorable condition for interception by the trap. Tests have shown, however, that the results hardly justify the additional complication, and so far as I am aware, this arrangement has enjoyed no extensive commercial use.

The present invention involves the removal of the oil by the interposition of a strainer or filter in the path of the liquefied refrigerant as the latter leaves the condenser, and preferably the conjoint use of such a filter with an oil trap which receives the refrigerant and oil from the condenser, effects a partial removal of the oil and discharges the refrigerant and the small remaining quantity of oil to the filter.

Simple as this scheme may seem on first consideration, its successful operation is attended with certain practical difficulties which are overcome by my invention. Any filter will, after a short period of use, offer substantial resistance to the passage through it of the liquid ammonia, so that work must be done in forcing the ammonia through the filter. It follows that the pressure on the discharge side of the filter must be lower than on the inlet side, a condition which it is difficult to maintain because the liquid ammonia on the discharge side tends to evaporate and equalize the pressures. To prevent such evaporation, or to reliquefy such ammonia gas as results from such evaporation, I produce artificially a drop in temperature equal to or greater than that corresponding to the desired drop in pressure through the filter.

This temperature drop may be caused in a variety of ways, and I illustrate several generally equivalent arrangements in the accompanying drawings, in which:

Fig. 1 is a diagrammatic elevation of a system embodying the invention and involving the use of a two-pipe expansion cooler between the filter and the receiver. In this view the compressor is omitted but the connections to and from the same are shown.

Fig. 2 is a fragmentary view showing how the receiver and expansion cooler of Fig. 1 may be combined in a single structure.

Fig. 4 is an elevation partly in section showing the filters and part of the oil trap, with their connections.

Fig. 5 is a view of one filter head chiefly in vertical axial section.

Fig. 6 is a section on the line 6—6 of Fig. 5.

Figure 3:
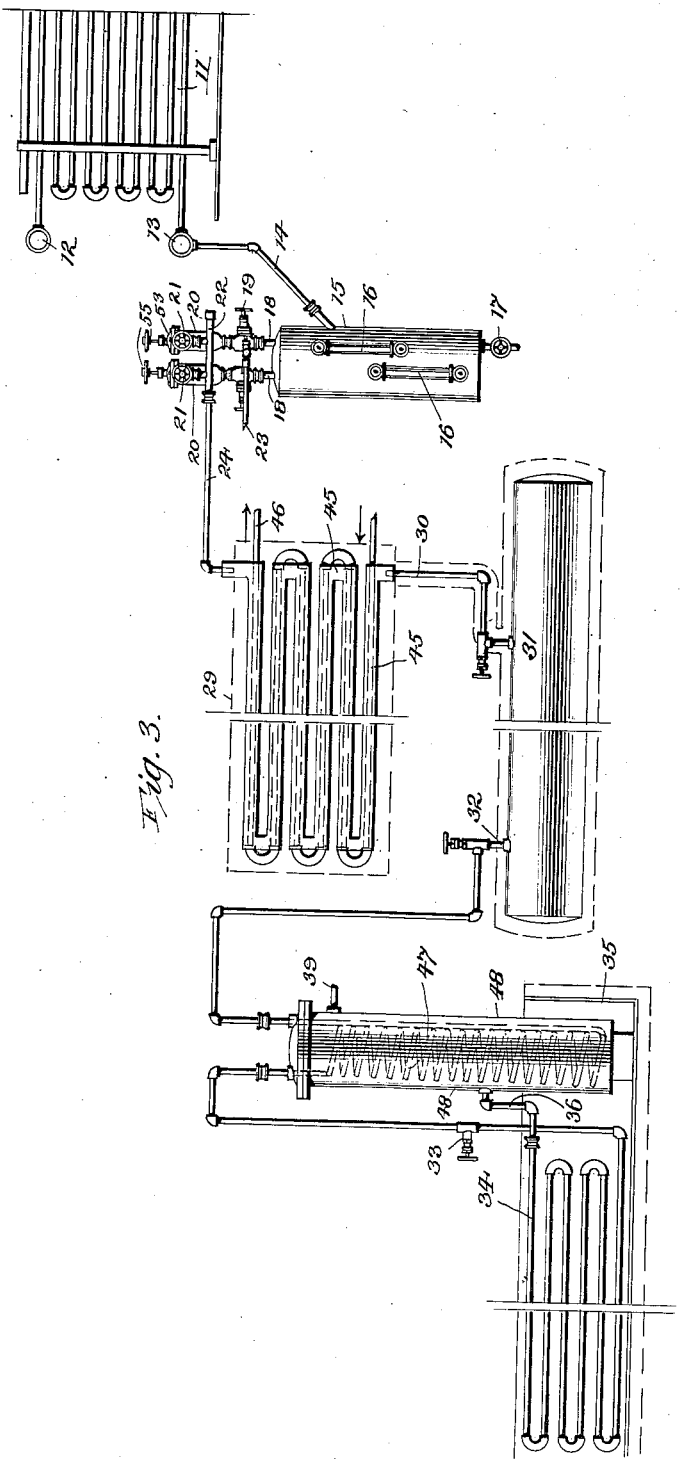
Fig. 3 is a view, similar to Fig. 1, showing a two-pipe liquid cooler, between the filter and the receiver.

I shall first describe the general arrangement of a number of specifically different systems in which the invention is embodied and shall describe in detail a preferred construction of combined oil trap and duplex filter head available for use in this relation with these and various other similar systems.

Referring first to Fig. 1, the ammonia condenser, which may be of any preferred construction, is illustrated at 11. The compressed gas is received from the compressor through the header 12 and after being liquefied by the cooling action of the condenser, is discharged through a header 13.

The liquid ammonia flows through the inclined pipe 14 to the oil trap which consists simply of an upright cylindrical trap chamber 15 provided with sight glasses 16. The pipe 14 enters the side of the trap chamber 15 in a downwardly inclined direction and within the trap chamber 15 the liquid ammonia and the oil separate by reason of their different specific gravities. The depth of oil in the trap is indicated in the sight glasses 16 and when the oil has accumulated in considerable quantity it may be drawn off in whole or in part through the valved connection 17 in the usual manner.

The liquid ammonia leaves the trap chamber 15 through one or the other of two vertical connections 18, each of which is controlled by a corresponding valve 19 and leads to a corresponding one of the two filter heads indicated generally by the numerals 20. After passing through the filter head 20, the liquid ammonia passes through one of the upper valves 21, to a manifold connection 22.

The valves 19 and 21 are for the purpose of permitting one filter head to be cut out for inspection or cleaning, while the other remains in the circuit. The pipe connection 23, shown in Fig. 1, is a so-called pump-out pipe, connected to the suction of the compressor and connected through suitable valves to the interior of the two filter heads 20, as will be hereinafter described in detail. This pump-out connection is used to pump ammonia gas from the interior of that filter which is out of use before opening the same.

The manifold 22 leads by way of a pipe 24 to a secondary cooler consisting of an inner pipe coil 25, through which the ammonia passes in a sinuous path and a surrounding cooling coil 26 into which ammonia is admitted through an expansion valve 27 and from which the ammonia gas is conducted by a pipe 28. The coils 25 and 26 are heat insulated, as indicated in dotted lines at 29, to prevent the absorption of heat from the atmosphere.

The liquid ammonia leaving the secondary cooler passes by way of a pipe 30 to an insulated receiver 31. The liquid ammonia passes from the receiver 31 through a pipe 32 which leads to the expansion valve 27 and also to the main expansion valve 33.

From the expansion valve 33 the ammonia flows downward to and then upward through the heat absorbing coil 34 which, in many installations, will be submerged in a brine tank 35. From the upper end of the heat absorbing coil 34 the expanded ammonia flows upward through a pipe 36 and then downward into the top of a trap 37. The pipe 28 which conveys the ammonia gas away from the cooling coil 26 also discharges into the top of the trap 37, and the purpose of this trap is to intercept any liquid ammonia which may leave the coils 26 and 34 either or both. Any such liquid ammonia flows by gravity from the bottom of the trap 37 through a pipe 38 to the bottom of the coil 34.

The pipe 39 leading from the side of the trap 37 near the top thereof, is connected to the suction side of the compressor. The compressor has been omitted from the drawings to simplify them, but it will be understood that this may assume any usual form and that it is connected between the pipe 39 and the header 12.

It is not essential that the secondary cooler, above described, be distinct from the receiver and in Fig. 2 I illustrate how the cooler and the receiver may be combined in a single structure. Essentially the change consists in expanding a certain portion of the ammonia passing from the receiver into a cooling coil enclosed within the receiver. In this figure, similar parts to those shown in Fig. 1 are similarly numbered. The pipe 24 which conveys ammonia to the receiver 31 is identical in form and function with the similarly numbered part in Fig. 1.

The liquid ammonia discharge pipe 32 leads to the main expansion valve 33, which is identical in function and which may be connected up with a cooling coil exactly as is illustrated in Fig. 1.

The expansion valve 27 is the same in form and function as the similarly numbered valve in Fig. 1 except that the ammonia expanded therethrough passes through a heat absorbing coil 26ª which is housed within the receiver 31 and acts to abstract heat from the ammonia in the receiver proper instead of abstracting it from the ammonia in its path from the filter to the receiver.

The ammonia off-take pipe 28 which leads from the coil 26ª is identical in function with the pipe 28 of Fig. 1.

The purpose of Fig. 2 is to indicate the general equivalence of two general types of cooler, that is to say broadly, a cooler interposed between the filter and the receiver and a cooler combined with the receiver, and this is true irrespective of the cooling medium used.

From the broad process standpoint, the important consideration is to have the ammonia on the discharge side of the filter at a lower temperature than on the entrance side, and to have the temperature difference at least equal to that corresponding to the pressure difference required for the operation of the filter.

In order to indicate that other types of cooler than the evaporative cooler described with references to Figs. 1 and 2 may be used, and in order to show that the particular arrangement of heat absorbing coil is not material to the invention, I have illustrated another embodiment of the invention in Fig. 3, in which the secondary cooler is of the liquid type and in which a differently connected heat absorbing coil is used. In this figure, parts numbered 11 to 24 inclusive are illustrated in exactly the form heretofore described. In this figure, the pipe 24 leads to the outer pipe coil 45 of the two-pipe liquid cooler whose inner pipe coil 46 is arranged to circulate water as a heat absorbing medium.

The coil 45 discharges cooled liquid ammonia through the pipe 30 into the receiver 31. From receiver 31 the liquid ammonia passes by way of the pipe 32 to and through a coil 47 which is housed within the accumulator shell 48. The shell 48 is partly submerged in the brine tank 35 and the liquid ammonia after passing through the coil 47 flows downward through the main expansion valve 33 and thence upward through the heat absorbing coil 34 from which it passes by way of the pipe 36 into the side of the accumulator shell 48. The connection 39 leads from the interior of the shell 48 to the compressor.

This will be recognized as one well known arrangement for operating the heat absorbing coils 34 on the flooded system without danger of returning liquid ammonia to the suction side of the compressor even when the temperature of the ammonia in the receiver is relatively high, as it is likely to be when a secondary water cooler is used.

Any liquid ammonia entering the accumulator shell 48 from the heat absorbing coil 34 will be boiled off by the heat conducted through the walls of the coil 47 from the relatively warm liquid ammonia flowing through such coils from the receiver. This heat interchange vaporizes any liqiud ammonia in the return line and reduces the temperature of the liquid ammonia flowing from the receiver to the main expansion valve.

The main point to be emphasized however is the general availability of many cooling agencies. Just as it is immaterial whether the secondary cooler be distinct from the receiver, so also it is immaterial whether the cooling agency be water or ammonia or any other available cooling medium.

Turning now to Figs. 4 to 6 inclusive, the preferred construction of the filter heads will be described. The valves 19 will be recognized as ammonia valves of the usual construction. Each valve is provided with an outlet 50 leading through a corresponding stop valve 51 to the pump-out connection 23, the connections 50 being so located as to drain the entire filter space beyond the valve.

The casing of each filter, to which the numerals 20 have been applied in the drawings as a means for indicating the general filter structure, are each mounted on the corresponding valves 19 and each is of the general cylindrical form illustrated in the drawing and each is provided with a laterally extending port 52 to which the respective valves 21 are connected.

The top of each filter casing is closed by a cap 53 bolted thereto and provided with a central axially threaded bore in which is threaded a rod 54 rotatable by means of a hand wheel 55. Leakage along the rod 54 is prevented by a packing gland and nut 56. A rib or shoulder 57 is formed on the interior of the filter castings just below the lateral port 52 and serves as a support for the filter medium proper.

This filter includes a perforated tube 58 having near its upper end a threaded collar 59 surrounding it and arranged to seat on the flange 57 and a cap or head 60 which is threaded on the lower end of the tube 58. The head 60 is provided with a central aperture 61 formed on its upper face with a conical valve seat which in the normal condition of the device is engaged and closed by a valve head 62 formed on the lower end of the rod 54. The perforated tube 58 is surrounded by two layers of woven metallic screen 63 and 64, the outer layer 64 being of finer mesh. Surrounding the screen 64 are two or more layers 65 of any preferred filtering medium capable of passing liquid refrigerant while obstructing the flow of oil.

The purpose of using the layers of screen cloth 63 and 64 is to provide a flow interval between the filter layers 65 and the outer surface of the perforated tube 58. In this way, the entire cylindrical surface of the filter is rendered effective.

The threaded rod 54 and its valve head 62 serve two useful purposes. When screwed down they hold the filter element tightly in position. When slightly retracted they open the port 61 and facilitate the operation of pumping out the filter head. It is understood that the two filter heads are not usually in use simultaneously except for the short period when a clean head is cut in preparatory to cutting out the other head for cleaning. The normal condition is that the valves 19 and 21 of one filter head are open, placing the corresponding filter in action while the valves 19 and 21 of the other filter head are both closed, the second filter head either being in process of dismounting and cleaning or else standing by until needed.

While I have shown several alternative systems embodying the invention, I do not mean to imply that these are the only possible embodiments, for obviously there are many different ways in which the desired temperature drop can be effected and particular installations will offer favorable opportunities to accomplish the desired result in special and economical ways, but such details are too numerous to discuss in the present application. Certain of them will be made the subject of related applications.

What is claimed is:

1. The method of removing oil from the refrigerant circulating in a refrigerating system which consists in subjecting the refrigerant while in a liquid state to a filtering operation to remove the oil, and overcoming the tendency of the refrigerant to vaporize as it leaves the filter by reducing its temperature.

2. The method of removing oil from the refrigerant circulating in a refrigerating system which consists in filtering the refrigerant while in a liquid state to remove the oil, and simultaneously abstracting heat from the off-flowing filtrate to reduce the pressure thereof.

3. The method of removing oil from the refrigerant circulating in a refrigerating system, which consists in filtering the refrigerant while in a liquid state and artificially cooling the filtrate to produce a temperature drop through the filter corresponding to the pressure drop caused by the resistance of the filter elements to flow of refrigerant therethrough.

4. The method of removing oil from the refrigerant circulating in a refrigerating system which consists in cooling the oil laden compressed gaseous refrigerant until liquefaction of the refrigerant occurs, then filtering the liquefied gas to remove additional oil, and then further cooling the refrigerant as it leaves the filter to reduce the back pressure upon the filter.

5. The method of removing oil from the refrigerant circulating in a refrigerating system which consists in cooling the oil laden compressed gaseous refrigerant until liquefaction of the refrigerant occurs, then effecting a partial gravity separation of the oil from the liquid gas, then filtering the liquefied gas to remove additional oil, and then further cooling the refrigerant as it leaves the filter to reduce the back pressure upon the filter.

6. The method of removing oil from the refrigerant in a refrigerating system of the compressor condenser evaporator circuit type, which consists in subjecting the refrigerant between the compressor and the evaporator to a two-stage cooling treatment and filtering the refrigerant to remove the oil between such stages.

7. The method of removing oil from the refrigerant in a refrigerating system of the compressor condenser evaporator circuit type, which consists in subjecting the refrigerant between the compressor and the evaporator to a two-stage cooling treatment in the first stage of which the refrigerant is condensed, and filtering the refrigerant between such stages under the pressure head established by the temperature difference between stages.

8. The method of removing oil from the refrigerant in a refrigerating system of the compressor condenser evaporator circuit type, which consists in subjecting the refrigerant between the compressor and the evaporator to a two-stage cooling treatment in the first stage of which the refrigerant is condensed and subjecting the refrigerant as it flows between said stages to successive gravity separation and filtering treatments.

9. The combination with a refrigerating system of the compressor condenser evaporator circuit type, of a filter and a secondary cooler interposed in the refrigerant line between the condenser and the evaporator in the order stated.

10. The combination with a refrigerating system of the compressor condenser evaporator circuit type, of an oil separator, a filter and a secondary cooler interposed in the refrigerant line between the condenser and the evaporator in the order stated.

11. The combination with a refrigerating system of the compressor condenser evaporator circuit type of two filters connected in parallel with each other, and a secondary cooler, the filters and cooler being interposed in the refrigerant line in the order stated; and valve means for disconnecting either filter at will from the circuit.

12. The combination with a refrigerating system of the compressor condenser evaporator circuit type of two filters connected in parallel with each other, and a secondary cooler, the filters and cooler being interposed in the refrigerant line in the order stated; valve means for disconnecting either filter at will from the circuit; and pump-out connections for withdrawing refrigerant from the filters when so disconnected.

13. The combination with a refrigerating system of the compressor condenser evaporator circuit type, of a gravity oil separator, a plurality of filter heads connected in parallel, and a secondary cooler, the separator, filter heads and cooler being interposed in the order stated in the refrigerant line between the condenser and the evaporator, and valve means for disconnecting individual filter heads at will.

14. The combination with a refrigerating system of the compressor condenser avaporator circuit type, of a gravity oil separator, a plurality of filter heads connected in parallel, and a secondary cooler, the separator, filter heads and cooler being interposed in the order stated in the refrigerant line between the condenser and the evaporator; valve means for disconnecting individual filter heads at will; and valve means controlling connections between opposite sides of the filtering media in the respective filters.

15. The combination with a refrigerating system of the compressor condenser evaporator circuit type, of an oil separator and a filter interposed in the refrigerant line between the condenser and the evaporator in the order stated; and means for cooling the refrigerant on the discharge side of said filter to maintain a pressure drop through the filter.

16. The combination with a refrigerating system of the compressor condenser evaporator circuit type, of a gravity oil separator having a plurality of filter heads connected in parallel, and means for cooling the refrigerant on the discharge side of said filter to maintain a difference in pressure on opposite sides thereof, and valve means for disconnecting individual filter heads at will.

In testimony whereof I have signed my name to this specification.

THOMAS SHIPLEY.